(12) United States Patent
Chirko et al.

(10) Patent No.: US 11,105,175 B2
(45) Date of Patent: Aug. 31, 2021

(54) ADJUSTABLE FRAC FLOW LINE

(71) Applicant: FMC Technologies, Inc., Houston, TX (US)

(72) Inventors: Roman Chirko, Houston, TX (US); Dan R. Fink, Porter, TX (US); Brian J. Baca, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 234 days.

(21) Appl. No.: 16/168,411

(22) Filed: Oct. 23, 2018

(65) Prior Publication Data

US 2019/0128454 A1    May 2, 2019

Related U.S. Application Data

(60) Provisional application No. 62/575,975, filed on Oct. 23, 2017.

(51) Int. Cl.
| | | |
|---|---|---|
| *E21B 33/068* | (2006.01) | |
| *E21B 17/02* | (2006.01) | |
| *E21B 34/00* | (2006.01) | |
| *F16L 27/12* | (2006.01) | |
| *E21B 43/26* | (2006.01) | |
| *F16L 23/024* | (2006.01) | |
| *F16L 23/032* | (2006.01) | |

(52) U.S. Cl.
CPC ............ *E21B 33/068* (2013.01); *E21B 17/02* (2013.01); *E21B 34/00* (2013.01); *F16L 27/125* (2013.01); *F16L 27/1274* (2019.08); *F16L 27/12751* (2019.08); *E21B 43/26* (2013.01); *F16L 23/024* (2013.01); *F16L 23/032* (2013.01)

(58) Field of Classification Search
CPC ........ E21B 17/02; E21B 17/041; E21B 34/00; E21B 33/068; E21B 43/26; E21B 43/2607; F16L 23/024; F16L 23/032; F16L 27/1274; F16L 27/125; F16L 27/12751; F16L 27/127; F16L 27/1275
See application file for complete search history.

(56) References Cited

U.S. PATENT DOCUMENTS

| | | | | |
|---|---|---|---|---|
| 1,868,014 | A * | 7/1932 | Lucas | F16L 27/12751 285/111 |
| 2011/0169224 | A1* | 7/2011 | Nguyen | E21B 33/04 277/314 |
| 2014/0246211 | A1* | 9/2014 | Guidry | F16L 27/12751 166/379 |

FOREIGN PATENT DOCUMENTS

GB        1170412 A  * 11/1969   ........ F16L 27/12751

* cited by examiner

*Primary Examiner* — George S Gray
(74) *Attorney, Agent, or Firm* — Osha Bergman Watanabe & Burton LLP

(57) ABSTRACT

An adjustable flow line may include an outer pipe body having a first flange, an inner pipe body partially disposed within the outer pipe body and axially translatable with respect to the outer pipe body, a metal seal positioned between an outer surface of inner pipe body and an inner surface of the outer pipe body, a sleeve positioned around the inner pipe body and outside of the outer pipe body, and a second flange positioned around the inner pipe body, wherein when connected to the first flange. The sleeve may be axially translatable with respect to the inner pipe body. The second flange may axially secure the sleeve with respect to the outer pipe body and cause the sleeve to energize the metal seal.

13 Claims, 9 Drawing Sheets

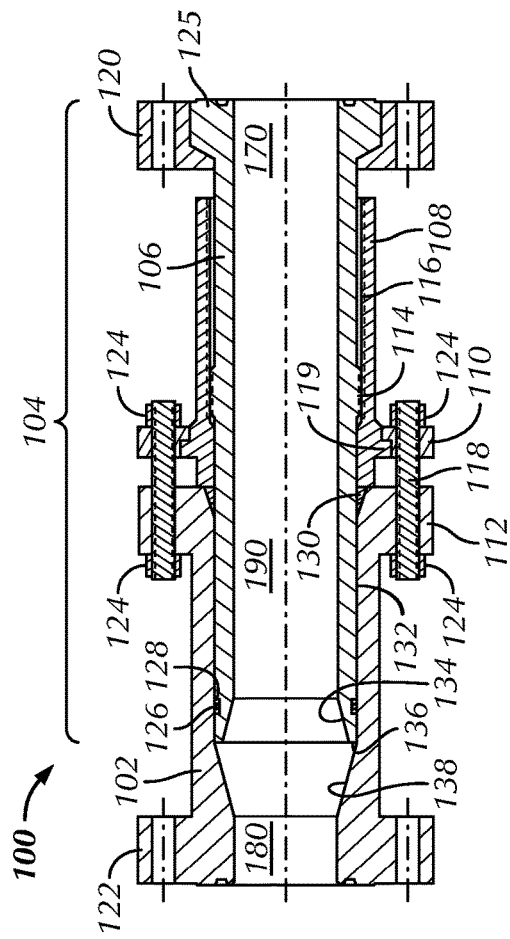
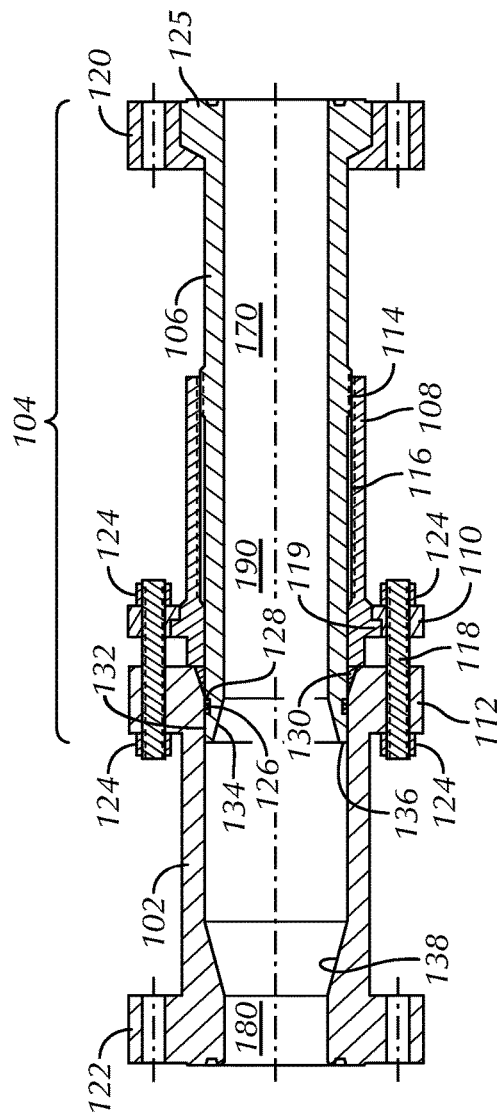
FIG. 1A
FIG. 1B

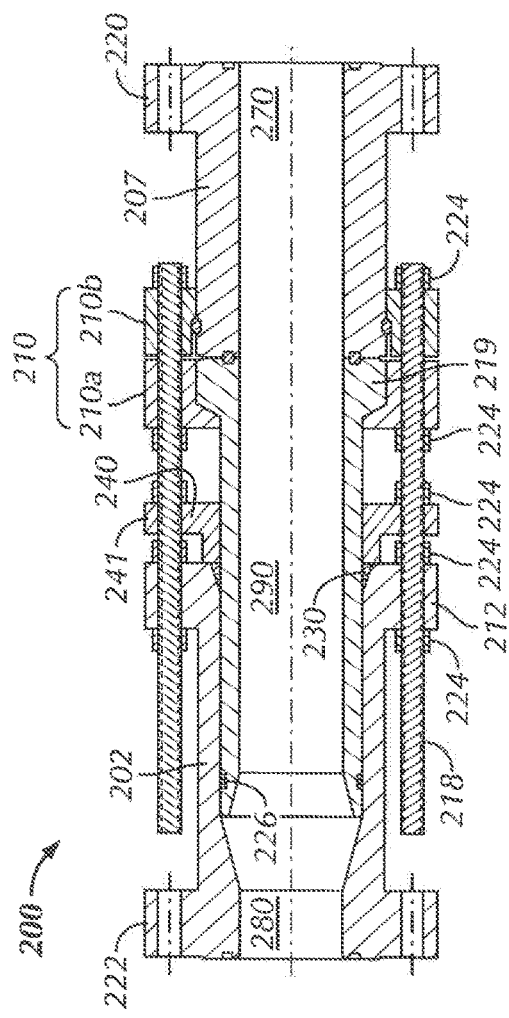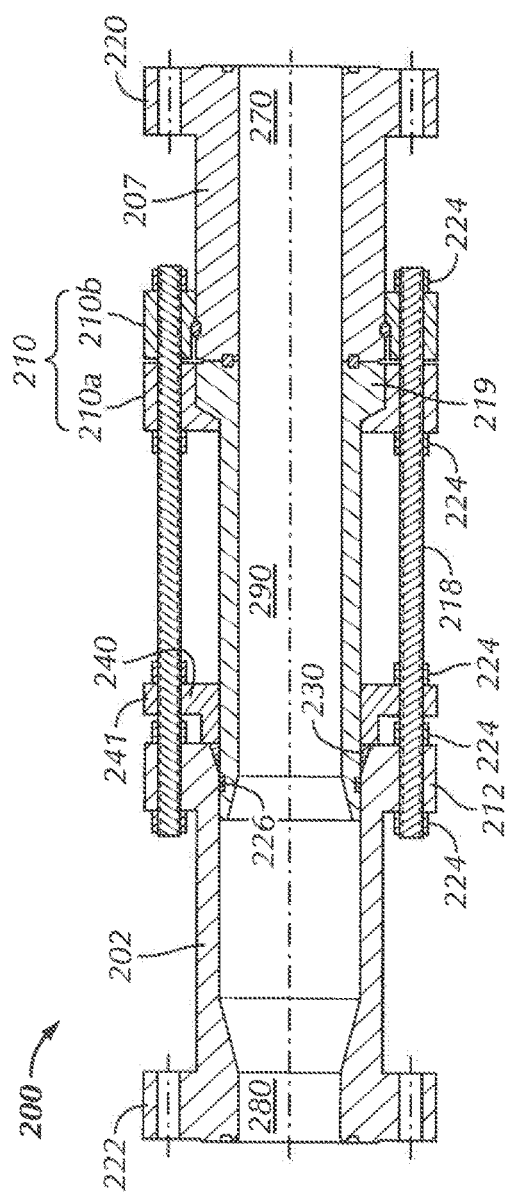

ADJUSTABLE FRAC FLOW LINE

BACKGROUND

Frac fluid is injected through drilling equipment and flow lines connecting the equipment to perform wellbore operations. Frac fluid is often injected at high pressures and extreme temperatures, and often contains erosive materials, such as sand or other particulates. Flow lines connecting frac equipment must be able to withstand such conditions for extended periods of time without sustaining damage. Damage sustained by the flow lines may cause them to fail.

Flow lines may be connected between frac equipment after the drilling equipment has been placed in a well pad environment. Any gaps between the flow lines and the frac equipment may cause failure of the flow lines at the points of connection. The location and orientation of each piece of equipment may not be known precisely. Therefore, it may be challenging to connect frac equipment to pre-sized flow lines without having small gaps at the connection points.

Failure of flow lines may cause loss of pressure within the flow lines, which may result in damage to frac equipment or leakage of frac fluid into the surrounding environment. The time necessary to repair damaged flow lines may reduce the productivity of a well pad site.

SUMMARY OF THE DISCLOSURE

Embodiments disclosed herein provide flow lines that may be precisely fit to the particular arrangement of equipment at the well site and that are robust to wellbore operating conditions.

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure relates to an adjustable flow line which may include an outer pipe body having a first flange, an inner pipe body partially disposed within the outer pipe body and axially translatable with respect to the outer pipe body, a metal seal positioned between an outer surface of inner pipe body and an inner surface of the outer pipe body, a sleeve positioned around the inner pipe body and outside of the outer pipe body, and a second flange positioned around the inner pipe body, wherein when connected to the first flange. The sleeve may be axially translatable with respect to the inner pipe body. The second flange may axially secure the sleeve with respect to the outer pipe body and cause the sleeve to energize the metal seal.

In another aspect, the present disclosure relates to an adjustable flow line which may include a first pipe body including a first flange, a second pipe body including a second flange, a seal disposed partially within the first pipe body and the second pipe body, a nut disposed around a threaded portion of the seal and contacting an end of the first pipe body, and one or more threaded rods configured to secure the first flange to the second flange. At least one of the first pipe body and the second pipe body may be axially translatable relative to the seal.

In another aspect, the present disclosure relates to a customizable flow line which may include an inner pipe body including an inlet and a first flange, an outer pipe body including an outlet and a second flange, a through-bore connecting the inlet to the outlet, and one or more shims disposed around the inner pipe body and contacting the second flange. The inner pipe body may be disposed partially within the outer pipe body. The length of the flow line may be customizable. The first flange may be connected to the second flange via one or more threaded rods, and nuts disposed on the rods and contacting the first flange and second flange may be configured to secure to the outer pipe body to the inner pipe body.

In another aspect, the present disclosure relates to a method of performing a wellbore operation using an adjustable or customizable flow line. The method may include the following steps: attaching the inner pipe body to a first piping component, adjusting a length of the flow line, attaching the outer annular body to a second piping component, securing the flow line in position and activating a seal, and injecting a frac fluid into the first piping component.

In another aspect, the present disclosure relates to a system which may include on or more fracture trees, one or more manifold valve blocks, and one or more adjustable or customizable flow lines. Each of the one or more fracture trees may be connected to one of the one or more manifold valve blocks via one or more adjustable or customizable flow lines. Each of the one or more manifold valve blocks is connected to at least one other of the one or more manifold valve blocks via one or more adjustable or customizable flow lines.

Other aspects and advantages will be apparent from the following description and the appended claims.

BRIEF DESCRIPTION OF DRAWINGS

FIG. 1a is a cross-section view of a flow line in accordance with the present disclosure.

FIG. 1b is a cross-section view of a flow line in accordance with the present disclosure.

FIG. 2a is a cross-section view of a flow line in accordance with the present disclosure.

FIG. 2b is a cross-section view of a flow line in accordance with the present disclosure.

DETAILED DESCRIPTION

Figure 3:
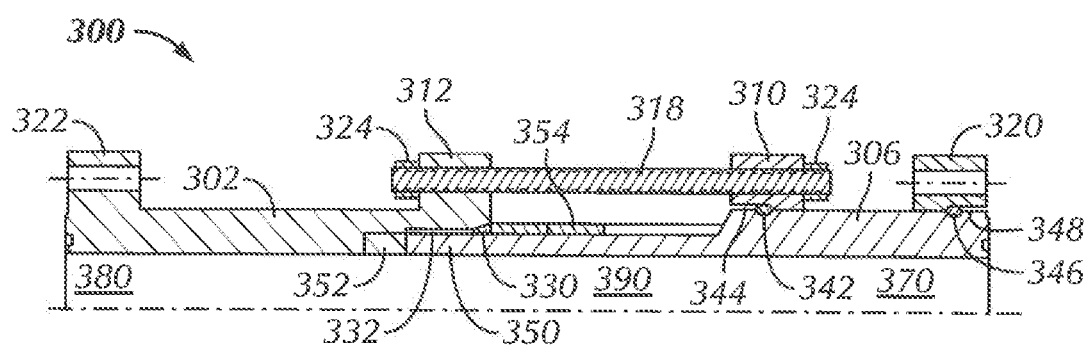
FIG. 3 is a cross-section view of a flow line in accordance with the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the term "coupled" or "coupled to" or "connected" or "connected to" may indicate establishing either a direct or indirect connection, and is not limited to either unless expressly referenced as such.

In one aspect, the present disclosure relates to a flow line having an adjustable length. The flow line may be suitable for connecting piping components at various distances from each other and for connecting piping components when the exact distance between the components is not known. The flow line may be configured to connect piping components in a frac environment.

FIGS. 1a-1b illustrate an adjustable flow line 100 in accordance with the present disclosure. FIG. 1a illustrates the flow line 100 in a collapsed configuration and FIG. 1b illustrates the flow line in an expanded configuration. The flowline 100 may include an inlet 170, an outlet 180, and a through-bore 190, such that fluid may flow into the inlet 170, through the through-bore 190, and out of the outlet 180.

The flow line 100 includes an outer pipe body 102 proximate the outlet 180 and an inner pipe assembly 104 proximate the inlet 170. The inner pipe assembly 104 may include an inner pipe body 106 and a sleeve 108. The inner pipe body 106 may be disposed partially within the outer pipe body 102. The sleeve 108 may be disposed around the inner pipe body 106.

The inner pipe body 106 and the outer pipe body 102 may be translatable relative to each other. Translation of the inner pipe body 106 relative to the outer pipe body 102 may change the overall length of the flow line 100.

In some embodiments, as shown in FIGS. 1a-1b, the inner pipe body 106 may have a threaded outer surface 114 and the sleeve 108 may have a threaded inner surface 116. Rotating the inner pipe body 106 may translate the inner pipe body 106 relative to the sleeve 108. This relative translation may result in the movement of either the inner pipe body 106 or the sleeve 108, as will be discussed in more detail below. In some embodiments, the inner pipe body 106 and the sleeve 108 may be translatable relative to each other via a mechanism other than rotation along threaded surfaces.

The inner pipe assembly 104 may be securable to the outer pipe body 102. The inner pipe assembly 104 may include a first flange 110 and the outer pipe body may include a second flange 112. The first flange 110 and the second flange 112 may be located at a medial area of the flow line 100. The first flange 110 and the second flange 112 may be securable to each other. Securing the first flange 10 and the second flange 112 to each other may secure the outer pipe body 102 to the inner pipe assembly 104.

In some embodiments, as shown in FIGS. 1a-1b, the first flange 110 and the second flange 112 may be connected to each other via one or more threaded rods 118. The threaded rods 118 may be secured to the flanges 110, 112 via nuts 124. The threaded rods 118 may be radially symmetric about the flow line 100. In some embodiments, the first flange 110 and the second flange 112 may be secured to each other via any means known in the art.

In some embodiments, as shown in FIGS. 1a-1b, the first flange 110 may comprise a rotatable flange component disposed around the inner body assembly 104 and maintained in position via a circumferential protrusion or shoulder 119 formed on the sleeve 108. The second flange 112 may be integral with the outer surface of the outer pipe body 102. The second flange 112 may be formed at an end of the outer pipe body 102. In some embodiments, either flange 110, 112 may be formed integrally to the outer pipe bodies 102 or the sleeve 108, or may be a component disposed around the outer pipe bodies 102 or the sleeve 108.

The inner pipe body 106 and the outer pipe body 102 may be configured to connect to other piping components (not shown), at the inlet 170 and the outlet 180, respectively, of the flow line 100. In some embodiments, the inner pipe body 106 may include a first connector flange 120 and the outer pipe body 102 may include a second connector flange 122. The connector flanges 120, 122 may be configured to connect to other piping components. In some embodiments, elements other than connector flanges may be used to connect the flow line 100 to piping components at the inlet 170 and the outlet 180, such as a threaded connection or any other connection known in the art.

In some embodiments, as shown in FIGS. 1a-1b, the first connector flange 120 may comprise a rotatable flange component disposed around the inner pipe body 106 and may be retained in position by a circumferential protrusion 125 formed on the outer surface of the inner pipe body 106. The second connector flange 122 may be integral with the outer surface of the outer pipe body 102. In some embodiments, either connector flange 120, 122 may be formed integrally to the pipe bodies 102, 106, or may be a component disposed around the pipe bodies 102, 106.

Flanges 110, 112, 120, 122 may include holes for attachment to adjacent flanges and/or holes for use with a linear positioner, such as an all-thread screw. A linear positioner may allow the positions of the pipe bodies 102, 106 and the overall length of the flow line 100 to be adjusted. The use of a combination of both fixed and rotatable flanges allows the flow line 100 to be coupled to piping components without concern for the relative configuration of the bolt holes in the respective flanges.

The flow line 100 may include features that enable it to be used in wellbore operations. The flow line 100 may be able to withstand high pressures and may be robust to damage from corrosive and erosive materials, such as sand or other particulates flowing therethrough.

The flow line 100 may include seals which may prevent high pressure fluid from flowing into or out the flow line 100, particularly at the juncture of the inner pipe assembly 104 and the outer pipe body 102, proximate the through-bore 190.

The flow line 100 may include an elastomer seal 126. The elastomer seal 126 may be disposed in a groove 128 formed in an outer surface of the inner pipe body 106. The groove 128 may be proximate the end of the inner pipe body 106 which is located inside of the outer pipe body 102. The elastomer seal 126 may be made of any material known in the art to be capable of withstanding standard operating conditions. In some embodiments, the elastomer seal 126 may be a seal assembly including an anti-extrusion ring (not shown). In some embodiments, the groove 128 may include features (not shown) to retain the seal 126 therein.

The elastomer seal 126 may prevent the flow of fluid and/or particulates into the space between the outer pipe body 102 and the inner pipe body 106. By preventing the flow of fluid therethrough, the elastomer seal 126 may prevent the loss of pressure inside of the flow line 100. By preventing the flow of particulates therethrough, the elastomer seal 126 may prevent the erosion of the outer surface of the inner pipe body 106 and the inner surface of the outer pipe body 102 in the area where the surfaces are proximate each other. Erosion of this area may increase the space between the inner pipe body 106 and the outer pipe body 102, thereby enabling fluid and particulates to flow into the area more easily. The elastomer seal 126 may extend the lifespan of the flow line 100 by preventing damage to the pipe bodies 102, 106.

The flow line 100 may include a metal seal 130. The metal seal 130 may be disposed between the inner pipe body 106 and the outer pipe body 102, proximate the second flange 112. The metal seal 130 may be positioned with in a within a wedge-shaped pocket formed by an outer surface of the inner pipe body 106 and an inner surface of the outer pipe body 102. An end of the metal seal 130 may be approximately level with the end of the second flange 112. The metal seal 130 may be activated when the flanges 110, 112 are fully secured to each other, such that an end of the sleeve 108 is pressed against an end of the metal seal 130. The metal seal 130 may have a wedge profile, as shown in FIGS. 1*a*-1*b*. Fully securing the flanges 110, 112 to each other may press the metal seal 130 fully into the space between the outer pipe body 102 and the inner pipe body 106. The metal seal 130 may prevent the flow of fluid and particulates into the space between the inner pipe body 106 and the outer pipe body 102 in the area at which they contact each other, and may thereby confer advantages similar to those described above in relation to the elastomer seal 126.

The area of contact 132 between the inner pipe body 106 and the outer pipe body 102 may form a metal-to-metal seal. A clearance (not shown) may be formed between the inner pipe body 106 and the outer pipe body 102. The clearance may be chosen such that the pipe bodies 102, 106 may be assembled together, but such that fluids and particulates may not readily flow between the pipe bodies 102, 106. The length of the area of contact 132 may also be chosen such that a metal-to-metal seal may be formed between the pipe bodies 102, 106 in the area of contact 132. The metal-to-metal seal may prevent particulates and fluids from passing between the inner pipe body and the outer pipe body 102. The elastomer seal 126 may further prevent particulates and fluid from entering the area of contact 132.

In some embodiments, the flow line 100 may include additional seals not described above. The flow line 100 may include some, all, or none of the seals described above. The seals included in the flow line 100 may prevent the loss of pressure within the flow line 100 and may prevent the flow line 100 from being damaged by particulates.

The inner surfaces of the inner pipe body 106 and the outer pipe body 102 may include features that prevent particulates from damaging the area of contact 132 of the pipe bodies, especially, the end of the area 132 which may be in contact with fluid flowing through the flow line 100. The inner surface of the inner pipe body 106 may include an outward slope 134 and a lip 136 proximate the junction. Particulates in fluid flowing from the inlet 170 to the outlet 180 may be prevented from contacting or becoming stagnant near the junction. In some embodiments, the inner surface of the outer pipe body 106 may include a sloped surface 138. The sloped surface 138 may throttle the inner diameter of the outer pipe body 102 down so that proximate the outlet 180 it is approximately the same as the inner diameter of the inner pipe body 106. In some embodiments, the inner surfaces of the pipe bodies 102, 106 may have any profile which prevents or minimizes the formation of eddies and/or the accumulation of particulates near the junction of the pipe bodies 102, 106, which may result in the erosion of the pipe bodies 102, 106.

In some embodiments, the outer pipe body 102 may be proximate the outlet 180 and the inner pipe assembly 104 may be proximate the inlet 170. The interior surfaces of the outer pipe body 102 and the inner pipe body 106, and the placement of seals, may be modified from the profiles and placements shown in FIG. 1 to minimize erosion to components of the flow line 100.

The flow line 100 may further provide strong, properly sealed connections with other piping components (not shown). The sleeve 108 may allow for precise adjustment of the length of the flow line 100, thereby ensuring proper alignment with other piping components. In some embodiments, the overall length of the flow line 100 may be tuned with a millimeter precision. The overall change in length which the flow line 100 may accommodate may depend on the size of the components, and may allow the flow line 100 to be form strong connections in a variety of wellbore systems. The connections may prevent loss of pressure within the system, and thereby prevent damage to the system or the surrounding environment.

The flow line 100 may be customized to have a desired length and assembled using one of the following procedures. Two exemplary procedures are described below. However, the flow line 100 may be customized using any combination of steps described below or any other methods know in the art without departing from the scope of the disclosure.

In a first exemplary embodiment, the flow line 100 may be made up before being inserted into a wellbore system. The inner pipe assembly 104 and the outer pipe body 102 may be positioned such that the flow line 100 has a desired length. The inner pipe assembly 104 and the outer pipe body 102 may be positioned by rotating the sleeve 108 about the inner pipe body 106. The inner pipe body 106 and the outer pipe body 102 may be held in position.

The pipe bodies 102, 106 may be held in position using any means known in the art. For example, the pipe bodies 102, 106 may be clamped in position. The desired length of the flow line 100 may be known, for example, by measuring the distance between the two piping components which the flow line 100 will be inserted between.

The flow line 100 may then be made up. The sleeve 108 may be rotated around the inner pipe body 106 to move the sleeve 108 towards the outer pipe body 102, until an end of the sleeve 108 contacts the second flange 112. The pressure of the sleeve 108 against the metal seal 130 may activate the metal seal 130, causing it to seal against the first pipe body 106 and the second pipe body 102.

In a second exemplary embodiment, the flow line 100 may be made up after being inserted into a wellbore system. The inner pipe assembly 104 and the outer pipe body 102 may be positioned such that the flow line 100 has a desired length. The inner pipe assembly 104 and the outer pipe body 102 may be positioned by rotating the sleeve 108 about the inner pipe body 106. The inner pipe body 106 and the outer pipe body 102 may be held in position.

The pipe bodies 102, 106 may be held in position by being secured to piping components at the inlet 170 and the outlet 180, for example, via the connector flanges 120, 122. The desired length of the flow line 100 may not be known. Instead, connecting the pipe bodies 102, 106 to the piping components may position the pipe bodies 102, 106 such that the flow line 100 has a desired length.

The flow line 100 may then be made up. The sleeve 108 may be rotated around the inner pipe body 106 to move the sleeve 108 towards the outer pipe body 102, until an end of the sleeve 108 contacts the second flange 112. The pressure of the sleeve 108 against the metal seal 130 may activate the metal seal 130, causing it to seal against the first pipe body 106 and the second pipe body 102.

The flanges 110, 112 may be secured to each other using the threaded rods 118 and nuts 124. The nuts 124 may be rotated such that a nut 124 coupled to each rod 118 contacts each of the flanges 110, 112, as shown in FIGS. 1a-1b. Securing the flanges 110, 112 to each other may lock the sleeve 108 and the inner pipe body 106 in position relative to each other. In some embodiments, the sleeve 108 and the inner pipe body 106 may be locked in position relative to each other using any means known in the art.

FIGS. 2a-2b illustrate an embodiment of an adjustable flow line 200 in accordance with the present disclosure. FIG. 2a illustrates the flow line 200 in a collapsed configuration and FIG. 2b illustrates the flow line in an expanded configuration. The flowline 200 may include an inlet 270, an outlet 280, and a through-bore 290, such that fluid may flow into the inlet 270, through the through-bore 290, and out of the outlet 280.

The flow line 200 may include an outer pipe body 202 proximate the outlet 280, an inlet pipe body 207 proximate the inlet, and an inner pipe body 206 between the outer pipe body 202 and the inlet pipe body 207. The inner pipe body 206 may be disposed partially within the outer pipe body 202.

The inner pipe body 206 and the outer pipe body 202 may be translatable relative to each other. Translating the inner pipe body 206 relative to the outer pipe body 202 may change the length of the flow line 200. The inlet pipe body 207 may be fixedly joined to the inner pipe body 206. In some embodiments, the inlet pipe body 207 and the inner pipe body 206 may be formed as an integral component.

The inner pipe body 206 and the inlet pipe body 207 may be connected to the outer pipe body 202. The inner pipe body 206 and the inlet pipe body 207 may include a first flange 210 and the outer pipe body 202 may include a second flange 212. The first flange 210 and the second flange 212 may be located at a medial area of the flow line 200. The first flange 210 and the second flange 212 may be securable to each other. Securing the first flange 210 and the second flange 212 to each other may secure the outer pipe body 202 to the inner pipe body 206 and the inlet pipe body 207.

In some embodiments, as shown in FIGS. 2a-2b, the first flange 210 may comprise a rotatable flange component disposed around the juncture of the inlet pipe body 207 and the inner pipe body 206 and maintained in position via a circumferential protrusion 219 formed on the inner and inlet pipe bodies 206, 207. The first flange may comprise two components 210a and 210b, which may be secured to each other. The second flange 212 may be integral with the outer surface of the outer pipe body 202. The second flange 212 may be formed at an end of the outer pipe body 202. In some embodiments, either flange 210, 212 may be formed integrally to the pipe bodies 202, 206, 207, or may be a component disposed around the pipe bodies 202, 206, 207.

The flow line 200 may further comprise a medial flange 240. The medial flange 240 may be disposed around the inner pipe body 206, such that the medial flange 240 is between the first flange 210 and the second flange 212. The medial flange 240 may have a lip 241 on the side proximate the inlet 270. The medial flange 240 may or may not be rotatable.

The first flange 210 and the second flange 212 may be connected to each other via one or more threaded rods 218. The threaded rods 218 may pass through the flanges 210, 212. The threaded rods 218 may or may not be threadedly engaged with the medial flange 240. The threaded rods 218 may be secured to the flanges 210, 212 via nuts 224. The threaded rods 218 may be radially symmetric about the flow line 200. In some embodiments, such as shown in FIGS. 2a-2b, nuts 224 may be disposed on both sides of the first flange 210 and second flange 212, such that the nuts 224 contact the flanges 210, 212.

The threaded rods 218 may pass through the medial flange 240. The threaded rods 218 may or may not be threadedly engaged with the medial flange 240. A nut 224 may be disposed on the side of the medial flange 240 closest to the inlet 270, such that the nut 224 contacts the medial flange 240.

The inlet pipe body 207 and the outer pipe body 202 may be configured to connect to other piping components (not shown), at the inlet 270 and the outlet 280, respectively, of the flow line 200. In some embodiments, the inlet pipe body 207 may include a first connector flange 220 and the outer pipe body 202 may include a second connector flange 222. The connector flanges 220, 222 may be configured to connect to other piping components. In some embodiments, elements other than connector flanges may be used to connect the flow line 200 to piping components at the inlet 270 and the outlet 280.

In some embodiments, as shown in FIGS. 2a-2b, the first connector flange 220 may be integral with the outer surface of the inlet pipe body 207. The second connector flange 222 may be integral with the outer surface of the outer pipe body 202. In some embodiments, either connector flange 220, 222 may be formed integrally to the pipe bodies 202, 207, or may be a component disposed around the pipe bodies 202, 207. In some embodiments, the first connector flange 220 and/or the second connector flange 222 may be rotatable.

Flanges 210, 212, 220, 222, 240 may include holes for attachment to adjacent flanges and/or holes for use with a linear positioner, such as an all-thread screw. A linear positioner may allow the positions of the pipe bodies 202, 206, 207 and the overall length of the flow line 200 to be adjusted. The use of a combination of both fixed and rotatable flanges allows the flow line 200 to be coupled to piping components without concern for the relative configuration of the bolt holes in the respective flanges.

The flow line 200 may include features that enable it to be used in wellbore operations. The flow line 200 may be able to withstand high pressures and may be robust to damage from corrosive and erosive materials, such as sand or other particulates flowing therethrough.

The flow line 200 may include seals which may prevent high pressure fluid from flowing into or out the flow line 200, particularly at the juncture of the inner pipe body 206 and the outer pipe body 202, proximate the through-bore 290.

The flow line 200 may include an elastomer seal 226, a metal seal 230, and a metal-to-metal seal, similar to the elastomer seal 126, the metal seal 130, and the metal-to-metal seal described above, with respect to FIGS. 1a-1b. The metal seal 230 may be activated by the pressure of the medial flange 240. The seals may have similar features and may provide similar benefits.

In some embodiments, the outer pipe body 202 may be proximate the outlet 280 and inner pipe body 206 may be proximate the inlet 270. The interior surfaces of the outer pipe body 202 and the inner pipe body 206, and the placement of seals, may be modified from the profiles and placements shown in FIG. 2 to minimize erosion to components of the flow line 200.

The flow line 200 may be configured to withstand operating pressures in frac environments. The flow line 200 may resist damage that may be caused by flowing corrosive and erosive materials such as sand or other particulates through the flowline 200. The flow line 200 may include any of the features described with respect to the previously discussed embodiment of the flow line 200, which enable the flow line to withstand high pressures, extreme temperatures, and erosive materials.

The flow line 200 may be customized to have a desired length and assembled using one of the following procedures. Two exemplary procedures are described below. However, the flow line 200 may be customized using any combination of steps described below or any other methods know in the art without departing from the scope of the disclosure.

In a first exemplary embodiment, the flow line 200 may be made up before being inserted into a wellbore system. The inner pipe body 206 may be joined to the inlet pipe body 207 by assembling the components 210a, 210b of the first connector flange 210. The inner pipe body 206, the inlet pipe body 207, and the outer pipe body 202 may be positioned such that the flow line 200 has a desired length. The pipe bodies 202, 206, 207 may be positioned by rotating the nuts 224 disposed around the threaded rods 218 and/or by rotating the threaded rods 218 within the flanges 210, 212, 240. Once the desired length is achieved, the pipe bodies 202, 206, 207 may be held in position.

The pipe bodies 202, 206 may be held in position using any means known in the art. For example, the pipe bodies 202, 206, 207 may be clamped in position. The desired length of the flow line 200 may be known, for example, by measuring the distance between the two piping components between which the flow line 200 will be inserted.

The flow line 200 may then be made up. The nuts 224 on either side of the first flange 210 and the second flange 212 may be tightened against the flanges 210, 212. The nuts 224 may hold the flanges 210, 212 in position, and thereby hold the pipe bodies 202, 206, 207 in position.

The nuts 224 on the inlet 270 side of the medial flange 240 may be tightened against the medial flange 240, such that the medial flange 240 is pressed against the metal seal 230. The pressure of the medial flange 240 against the metal seal 230 may activate the metal seal 230, causing the metal seal 230 to form contact seals with the inner pipe body 206 and the outer pipe body 202.

In a second exemplary embodiment, the flow line 200 may be made up after being inserted into a wellbore system. The inner pipe body 206 may be joined to the inlet pipe body 207 by assembling the components 210a, 210b of the first connector flange 210. The inner pipe body 206, the inlet pipe body 207, and the outer pipe body 202 may be positioned such that the flow line 200 has a desired length. The pipe bodies 202, 206, 207 may be positioned by rotating the nuts 224 disposed around the threaded rods 218 and/or by rotating the threaded rods 218 within the flanges 210, 212, 240. Once the desired length is achieved, the pipe bodies 202, 206, 207 may be held in position.

The pipe bodies 202, 206, 207 may be held in position by being secured to piping components at the inlet 270 and the outlet 280, for example, via the connector flanges 220, 222. The desired length of the flow line 200 may not be known. Instead, connecting the pipe bodies 202, 206, 207 to the piping components may position the pipe bodies 202, 206, 207 such that the flow line 200 has a desired length.

The flow line 200 may then be made up. The nuts 224 on either side of the first flange 210 and the second flange 212 may be tightened against the flanges 210, 212. The nuts 224 may hold the flanges 210, 212 in position, and thereby hold the pipe bodies 202, 206, 207 in position.

The nuts 224 on the inlet 270 side of the medial flange 240 may be tightened against the medial flange 240, such that the medial flange 240 is pressed against the metal seal 230. The pressure of the medial flange 240 against the metal seal 230 may activate the metal seal 230, causing the metal seal 230 to form contact seals with the inner pipe body 206 and the outer pipe body 202.

In another aspect, the present disclosure relates to a flow line that can be customized to have a desired length. The flow line may be configured to connect various piping components and equipment.

FIG. 3 illustrates a configurable flow line 300 in accordance with the present disclosure. The flow line 300 may include an inlet 370, an outlet 380, and a through-bore 390, such that fluid may flow into the inlet 370, through the through-bore 390, and out of the outlet 380.

The flow line 300 may include an outer pipe body 302 proximate the outlet 380 and an inner pipe body 306 proximate the inlet 370. The inner pipe body 306 may be disposed partially within the outer pipe body 302.

The inner pipe body 306 may be connected to the outer pipe body 302. The inner pipe body 306 may include a first flange 310 and the outer pipe body 302 may include a second flange 312. The first flange 310 and the second flange 312 may be located at a medial area of the flow line 300. The first flange 310 and the second flange 312 may be securable to each other. Securing the first flange 310 and the second flange 312 to each other may secure the outer pipe body 302 to the inner pipe body 306.

In some embodiments, as shown in FIG. 3, the first flange 310 may comprise a flange component disposed around the inner pipe body 306 and maintained in position via a split ring 342 disposed in a groove 344 formed on an outer surface of the inner pipe body 306. The second flange 312 may be integral with the outer surface of the outer pipe body 302. The second flange 312 may be formed at an end of the outer pipe body 302. In some embodiments, either flange 310, 312 may be formed integrally to the pipe bodies 302, 306, or may be a component disposed around the pipe bodies 302, 306.

The first flange 310 and the second flange 312 may be connected to each other via one or more threaded rods 318. The threaded rods 318 may pass through the flanges 310, 312. The threaded rods 318 may or may not be threadedly engaged with the flanges 310, 312. The threaded rods 318 may be secured to the flanges 310, 312 via nuts 324. The threaded rods 318 may be radially symmetric about the flow line 300. In some embodiments, such as shown in FIG. 3, nuts 324 may be disposed on the side of the first flange 310 proximate the inlet 370 and on the side of the second flange 312 proximate the outlet 380, such that the nuts 324 contact the flanges 310, 312.

The flow line 300 may further comprise one or more sleeves or shims 354. The sleeves or shims 354 may be disposed around the inner pipe body 306, such that the sleeves or shims 354 may be between the first flange 310 and the second flange 312. The sleeves or shims 354 may contact and apply pressure to a metal seal 330. Adjustment of the threaded rods 324 may push the sleeves or shims 354 against the metal seal 330, thereby activating the metal seal 330.

The inner pipe body 306 and the outer pipe body 302 may be configured to connect to other piping components (not shown), at the inlet 370 and the outlet 380, respectively, of the flow line 300. In some embodiments, the inner pipe body 306 may include a first connector flange 320 and the outer pipe body 302 may include a second connector flange 322. The connector flanges 320, 322 may be configured to connect to other piping components. In some embodiments, elements other than connector flanges may be used to connect the flow line 300 to piping components at the inlet 370 and the outlet 380.

In some embodiments, as shown in FIG. 3, the first connector flange may comprise a flange component disposed around the inner pipe body 306 and maintained in position via a split ring 346 disposed in a groove 348 formed on an outer surface of the inner pipe body 306. The second connector flange 322 may be integral with the outer surface of the outer pipe body 302. In some embodiments, either connector flange 320, 322 may be formed integrally to the pipe bodies 302, 306, or may be a component disposed around the pipe bodies 302, 306.

Flanges 310, 312, 320, 322 may include holes for attachment to adjacent flanges and/or holes for use with a linear positioner, such as an all-thread screw. A linear positioner may allow the positions of the pipe bodies 302, 306 and the overall length of the flow line 300 to be adjusted. The use of a combination of both fixed and rotatable flanges allows the flow line 300 to be coupled to piping components without concern for the relative configuration of the bolt holes in the respective flanges.

The flow line 300 may include features that enable it to be used in wellbore operations. The flow line 300 may be able to withstand high pressures and extreme temperatures and may be robust to damage from erosive materials, such as sand or other particulates flowing therethrough.

The flow line 300 may include seals which may prevent high pressure fluid from flowing into or out the flow line 300, particularly at the juncture of the inner pipe assembly 304 and the outer pipe body 302, proximate the through-bore 390.

The flow line 300 may include a metal seal 330. The metal seal 330 may be disposed between the inner pipe body 306 and the outer pipe body 302, proximate the second flange 312. An end of the metal seal 330 may be approximately level with the end of the second flange 312. The metal seal 330 may be activated when the flanges 310, 312 are fully secured to each other, such that an end of the sleeves or shims 354 is pressed against an end of the metal seal 130. The metal seal 330 may have a wedge profile, as shown in FIG. 3. Fully securing the flanges 310, 312 to each other may press the metal seal 330 fully into the space between the outer pipe body 302 and the inner pipe body 306.

The metal seal 330 may prevent the flow of fluid and/or particulates into the space between the outer pipe body 302 and the inner pipe body 306. By preventing the flow of fluid therethrough, the metal seal 330 may prevent the loss of pressure inside of the flow line 100. By preventing the flow of particulates therethrough, the metal seal 330 may prevent the erosion of the outer surface of the inner pipe body 306 and the inner surface of the outer pipe body 302 in the area where the surfaces are proximate each other. Erosion of this area may increase the space between the inner pipe body 306 and the outer pipe body 302, thereby enabling fluid and particulates to flow into the area more easily. The metal seal 330 may extend the lifespan of the flow line 300 by preventing damage to the pipe bodies 302, 306.

The area of contact 332 between the inner pipe body 306 and the outer pipe body 302 may form a metal-to-metal seal. A clearance (not shown) may be formed between the inner pipe body 306 and the outer pipe body 302. The clearance may be chosen such that the pipe bodies 302, 306 may be assembled together, but such that fluids and particulates may not readily flow between the pipe bodies 302, 306. The length of the area of contact 332 may also be chosen such that a seal may be formed between the pipe bodies 302, 306 in the area of contact 332. The metal-to-metal seal may prevent the flow of fluid and particulates into the space between the inner pipe body 306 and the outer pipe body 302 in the area at which they contact each other, and may thereby confer advantages similar to those described above in relation to the metal seal 330.

In some embodiments, the flow line 300 may include additional seals not described above. The flow line 300 may include some, all, or none of the seals described above. The seals included in the flow line 300 may prevent the loss of pressure within the flow line 300 and may prevent the flow line 300 from being damaged by particulates or high pressure fluids.

The inner surfaces of the inner pipe body 306 and the outer pipe body 302 may include features that prevent particulates from damaging the area of contact 332 of the pipe bodies, especially, the end of the area 332 proximate the through-bore 390. In some embodiments, the inner surfaces of the pipe bodies 302, 306 may have any profile which may prevent the formation of eddies and/or the accumulation of particulates near the junction of the pipe bodies 302, 306, which may cause damage to the pipe bodies 302, 306.

In some embodiments, the outer pipe body 302 may be proximate the outlet 380 and inner pipe body 306 may be proximate the inlet 370. The interior surfaces of the outer pipe body 302 and the inner pipe body 306, and the placement of seals, may be modified from the profiles and placements shown in FIG. 3 to minimize erosion to components of the flow line 300.

The flow line 300 may be customized to have a desired length and assembled using one of the following procedures. Three exemplary procedures are described below. However, the flow line 300 may be customized using any combination of steps described below or any other methods know in the art without departing from the scope of the disclosure.

In a first exemplary embodiment, the inner pipe body 306 may include an inner end 350 and the outer pipe body 302 may include an inner shoulder 352. The inner end 350 may contact the inner shoulder 352 when the flow line 300 is assembled, as shown in FIG. 3. The overall length of the flow line 300 may be customized by forming the inner pipe body 306 to have a particular length from the first flange 310 to the inner end 350. The distance between the first flange 310 to the inner end 350 may be formed as desired during manufacture of the inner pipe body 306, or may be formed afterwards by cutting the inner pipe body 306 proximate the inner end 350.

The sleeves or shims 354 may be designed such that when the inner end 350 contacts the inner shoulder 352, the sleeves or shims 354 contact the first flange 310 at one end and contact the second flange 312 at the other end.

Assembling the flow line 300 may comprise disposing the one or more sleeves or shims 354 around the inner pipe body 306 and disposing the inner pipe body 306 within the outer pipe body 302, such that the inner end 350 contacts the inner shoulder 352. The nuts 324 disposed on the threaded rods 318 may be tightened against the flanges 310, 312, such that the inner pipe body 306 and the outer pipe body 302 are secured to each other. The sleeves or shims 354 may apply pressure to the metal seal 330. The pressure may activate the metal seal 330, causing the metal seal to form contact seals with the inner pipe body 306 and the outer pipe body 302.

In a second exemplary embodiment, the overall length of the flow line 300 may be customized by designing the sleeves or shims 354 to have a particular length. The sleeves or shims 354 may be formed as an integral part of the inner pipe body 306 or may be a separate component disposed around the inner pipe body 306. The outer pipe body 302 may include a sloped surface (not shown) instead of an inner shoulder.

Assembling the flow line 300 may comprise disposing the inner pipe body 306 within the outer pipe body 302, such that the sleeves or shims 354 contact the second flange 312. An inner end 350 of the inner pipe body 306 may or may not contact an inner shoulder 352 of the outer pipe body 302. The nuts 324 disposed on the threaded rods 318 may be tightened against the flanges 310, 312, such that the inner pipe body 306 and the outer pipe body 302 are secured to each other. The sleeves or shims 354 may apply pressure to the metal seal 330. The pressure may activate the metal seal 330, causing the metal seal to form contact seals with the inner pipe body 306 and the outer pipe body 302.

In a third exemplary embodiment, the inner pipe body 306 may include an outer threaded surface (not shown) and the sleeves or shims 354 may include an inner threaded surface (not shown). Such a configuration may allow the sleeves or shims 354 to be translated relative to the inner pipe body 306. The overall length of the flow line 300 may be customized by positioning the sleeves or shims 354 to contact the second flange 312 at a particular point and locking the sleeves or shims 354 in that position. The sleeves or shims 354 may not contact the first flange 310. The outer pipe body 302 may include a sloped surface (not shown) instead of an inner shoulder.

Assembling the flow line 300 may comprise disposing the inner pipe body 306 within the outer pipe body 302, such that the sleeves or shims 354 contact the second flange 312. An inner end 350 of the inner pipe body 306 may or may not contact an inner shoulder 352 of the outer pipe body 302. The nuts 324 disposed on the threaded rods 318 may be tightened against the flanges 310, 312, such that the inner pipe body 306 and the outer pipe body 302 are secured to each other. The sleeves or shims 354 may apply pressure to the metal seal 330. The pressure may activate the metal seal 330, causing the metal seal to form contact seals with the inner pipe body 306 and the outer pipe body 302.

Figure 4A:
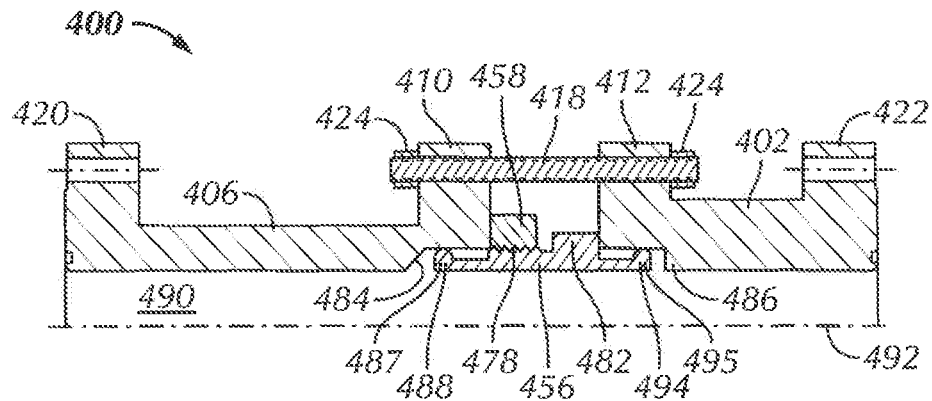
FIGS. 4a-4c are cross-section views of flow lines in accordance with embodiments of the present disclosure.
Figure 4B:
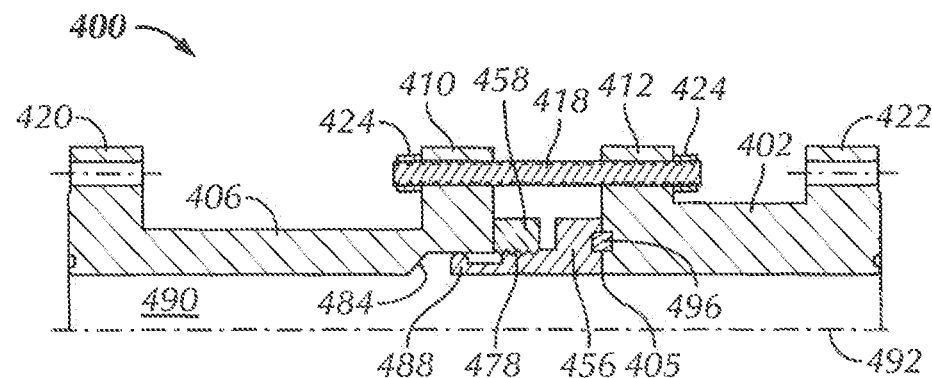
Figure 4C:
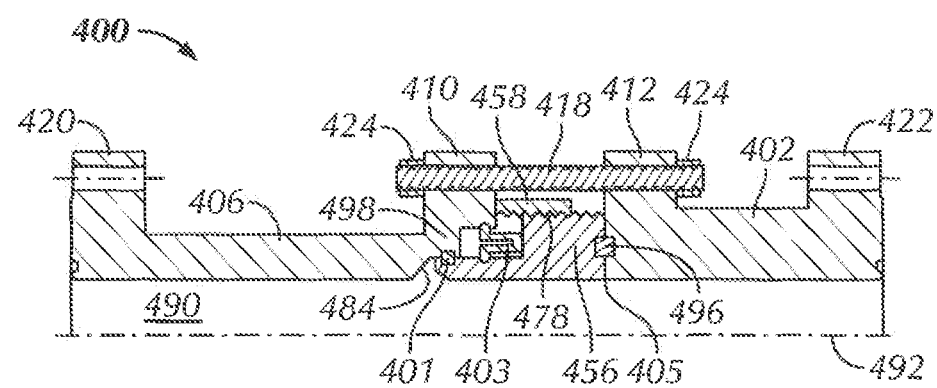

FIGS. 4a-4c illustrate adjustable or configurable flow lines 400 in accordance with embodiments of the present disclosure. The flow lines 400 may include a first pipe body 406, a second pipe body 402, and a sleeve 456 having a through-bore 490 with a central axis 492 formed therethrough. The first pipe body 406 and the second pipe body 402 may be disposed on either side of the sleeve 456. The sleeve 456 may be interior to the first pipe body 406 and the second pipe body 402. A nut 458 may be disposed around a threaded portion 478 of the sleeve 456. The flow line 400 may be designed such that fluid may be flowed through the flow line 400 in either direction.

The first pipe body 406 may be connected to the second pipe body 402. The first pipe body 406 may include a first flange 410 and the second pipe body 402 may include a second flange 412. The first flange 410 and the second flange 412 may be located at a medial area of the flow lines 400. The first flange 410 and the second flange 412 may be securable to each other. Securing the first flange 410 and the second flange 412 to each other may secure the first pipe body 406 to the second pipe body 402.

In some embodiments, as shown in FIGS. 4a-4c, the first flange 410 may be integral with the outer surface of the first pipe body 406 and may be formed at an end of the first pipe body 406. The second flange 412 may be integral with the outer surface of the outer pipe body 402. The second flange 412 may be formed at an end of the second pipe body 402. In some embodiments, either flange 410, 412 may be formed integrally to the pipe bodies 402, 406, or may be a component disposed around the pipe bodies 402, 406.

The first flange 410 and the second flange 412 may be connected to each other via one or more threaded rods 418. The threaded rods 418 may pass through the flanges 410, 412. The threaded rods 418 may or may not be threadedly engaged with the flanges 410, 412. The threaded rods 418 may be secured to the flanges 410, 412 via nuts 424. The threaded rods 418 may be radially symmetric about the flow line 400.

The first pipe body 406 and the second pipe body 402 may be configured to connect to other piping components (not shown). In some embodiments, the first pipe body 406 may include a first connector flange 420 and the second pipe body 402 may include a second connector flange 422. The connector flanges 420, 422 may be configured to connect to other piping components. In some embodiments, elements other than connector flanges may be used to connect the flow line 400 to piping components.

In some embodiments, as shown in FIG. 4, the first connector flange 420 may be integral with the outer surface of the first pipe body 406. The second connector flange 422 may be integral with the second surface of the outer pipe body 402. In some embodiments, either connector flange 420, 422 may be formed integrally to the pipe bodies 402, 406, or may be a component disposed around the pipe bodies 402, 406, such as a rotatable flange.

Flanges 410, 412, 420, 422 may include holes for attachment to adjacent flanges and/or holes for use with a linear positioner, such as an all-thread screw. Any, all, or none of the flanges 410, 412, 420, 422 may be fixed or rotatable. The use of a combination of both fixed and rotatable flanges allows the flow line 400 to be coupled to piping components without concern for the relative configuration of the bolt holes in the respective flanges.

The flow line 400 may include features that enable it to be used in wellbore operations. The flow line 400 may be able to withstand high pressures and extreme temperatures and may be robust to damage from erosive materials, such as sand or other particulates flowing therethrough.

FIGS. 4a-4c illustrate three exemplary embodiments of a flow line 400 having the features described above. A flow line 400 in accordance with this disclosure may have features shown in any of FIGS. 4a-4c, and may include a combination of features shown in multiple Figures.

Referring now to FIG. 4a, the nut 458 may contact an end of the first pipe body 406 and a shoulder 482 of the sleeve 456 may contact an end of the second pipe body 402. An inner shoulder 484 of the first pipe body 406 may accommodate a first end 487 of the sleeve 456 and an inner shoulder 486 of the second pipe body 402 may accommodate a second end 493 of the sleeve 456. The sleeve 456 may include a first sealing portion or protrusion 488 and a second sealing portion or protrusion 494, which may contact the first pipe body 406 and the second pipe body 402, respectively.

Referring now to FIG. 4b, the nut 458 may contact an end of the first pipe body 406 and an end 405 of the sleeve 456 may contact an end of the second pipe body 402. A gasket 496 may be disposed between the end 405 of the sleeve 456 and the end of the second pipe body 402. An inner shoulder 484 of the first pipe body 406 may accommodate a first end of the sleeve 456. The sleeve 456 may include a protrusion 488 which may contact the first pipe body 406. The protrusion 488 and the gasket 496 may form seals between the sleeve 456 and the pipe bodies 402, 406, respectively.

FIG. 4c illustrates an embodiment of a flow line 400. The nut 458 may contact an end of the first pipe body 406 and an end 405 of the sleeve 456 may contact an end of the second pipe body 402. A gasket 496 may be disposed between the end 405 of the sleeve 456 and the end of the second pipe body 402. A first inner shoulder 484 and a second inner shoulder 498 of the first pipe body 406 may accommodate a first end of the sleeve 456. Seals 401, 403 may be disposed between the sleeve 456 and the inner shoulders 484, 498. The seals 401, 403 and the gasket 496 may form seals between the sleeve 456 and the pipe bodies 402, 406.

The flow line 400 may be adjusted or customized to have a desired length and assembled using one of the following procedures. Three exemplary procedures are described below. However, the flow line 400 may be customized using any combination of steps described below or any other methods know in the art without departing from the scope of the disclosure.

In a first exemplary embodiment, the flow line 400 may be made up before being inserted into a wellbore system. Assembling the flow line 400 may comprise disposing the first pipe body 406 and the second pipe body around the sleeve 456, such that the second pipe body 402 contacts the shoulder 482 or the end 405. Seals 401 and 403 and a gasket 496 may be disposed between the sleeve 456 and the pipe bodies 402, 406 during assembly.

The first pipe body 406 and the second pipe body 402 may be positioned such that the flow line 400 has a desired overall length. The pipe bodies 402, 406 may be positioned by rotating the nut 458 relative to the sleeve 456, the position of the seal relative to the pipe bodies 402, 406 being maintained via threads 478, maintaining contact between nut 458 and pipe body 406 as well as between shoulder 482 and pipe body 402. Once the desired length is achieved, the pipe bodies 402, 406 may be held in position.

The pipe bodies 402, 406 may be held in position using any means known in the art. For example, the pipe bodies 402, 406 may be clamped in position. The desired length of the flow line 400 may be known, for example, by measuring the distance between the two piping components between which the flow line 400 will be inserted.

The flow line 400 may then be made up. The nuts 424 disposed on the threaded rods 418 may be tightened against the flanges 410, 412, such that the first pipe body 406 and the second pipe body 402 are secured to each other. The protrusions 488, 494, the shoulder 482, the seals 401, 403, and/or the gasket 496 may form seals with the pipe bodies 402, 406. The pipe bodies 402, 406 may be secured to piping components (not shown) via the connector flanges 420, 422.

In a second exemplary embodiment, the flow line 400 may be made up after being inserted into a wellbore system. The desired length of the flow line 400 may not be known. Instead, connecting the pipe bodies 402, 406 to the piping components may position the pipe bodies 402, 406, such that the flow line 400 has a desired length. This embodiment may be of particular interest when installing the flow line 400 in a system.

The flow line 400 may be partially made up. The flow line 400 may comprise disposing the first pipe body 406 and the second pipe body around the sleeve 456, such that the second pipe body 402 contacts the shoulder 482 or the end 405. Seals 401 and 403 and a gasket 496 may be disposed between the sleeve 456 and the pipe bodies 402, 406 during assembly.

The nuts 424 may not be tightened down, allowing the pipe bodies 402, 406 to "float" relative to one another and sleeve 456. Nut 458 may also be positioned such that the components may "float" relative to one another, providing for an overall length known to be less than that of the upstream and downstream piping components to be connected. This may make insertion of the flow line 400 on the sea floor easier by ensuring the flow line 400 fits between adjacent piping components, such that inward adjustment of the length is not necessary on the sea floor.

Following insertion of the flow line 400 into the system, the flanges 420, 422 may be connected to the upstream and downstream piping components. At this point, sleeve 456 is not in a fixed position with respect to pipe bodies 402, 406. The position of nut 458 may then be adjusted to engage nut 458 with pipe body 406 and to engage shoulder 482 (or end 405) with pipe body 402, thereby activating the seals at the desired overall length of the flow line 400. Prior to or subsequent to adjustment of nut 458, nuts 424 may be tightened.

In a third exemplary embodiment, the overall length of the flow line 400 may be customized by forming the sleeve 456 to have a particular length from the shoulder 482 to the threaded portion 478 around which the nut 458 is disposed, with reference to FIG. 4a, or by forming the sleeve 456 to have a particular length from the end 405 to the threaded portion 478 around which the nut 458 is disposed, with reference to FIGS. 4b-4c. The nut 458 may be formed integrally with the sleeve 456. The distance between the shoulder 482 or the end 405 and the nut 458 may be formed as desired during manufacture of the inner pipe body sleeve 456.

Assembling the flow line 400 may comprise disposing the first pipe body 406 and the second pipe body around the sleeve 456, such that first pipe body 406 contacts the nut 458 and the second pipe body 402 contacts the shoulder 482 or the end 405. Seals 401 and 403 and a gasket 496 may be disposed between the sleeve 456 and the pipe bodies 402, 406 during assembly. The nuts 424 disposed on the threaded rods 418 may be tightened against the flanges 410, 412, such that the first pipe body 406 and the second pipe body 402 are secured to each other. The protrusions 488, 494, the shoulder 482, the seals 401, 403, and/or the gasket 496 may form seals with the pipe bodies 402, 406.

Figure 5:
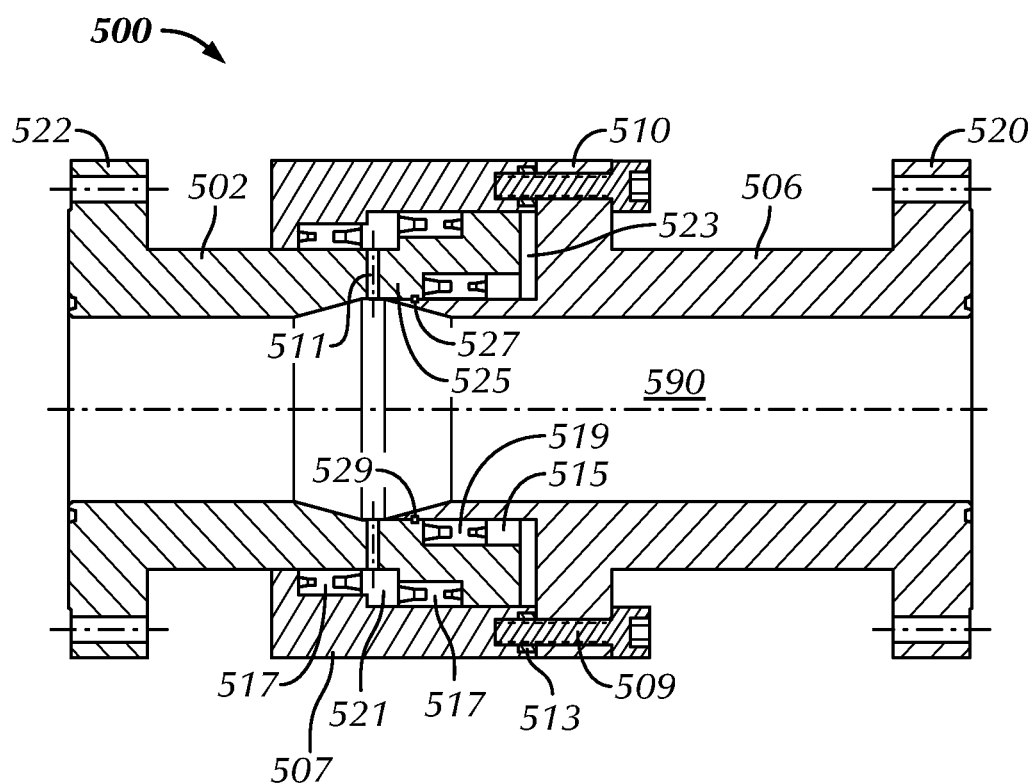
FIG. 5 is a cross-section view of a flow line in accordance with the present disclosure.

FIG. 5 illustrates another embodiment of an adjustable flow line 500 in accordance with the present disclosure. The flow line 500 may include an inner pipe body 506, an outer pipe body 502 having a through-bore 590 formed therethrough. The inner pipe body 506 may be disposed partially within the outer pipe body 502. The portions of the inner pipe body 506 and the outer pipe body 502 which overlap and/or contact each other may be any length. A sleeve 507 may be disposed around the outer pipe body 502. The sleeve 507 may also be connected to the inner pipe body 506, such as at a flange 510.

The inner pipe body 506 and the outer pipe body 502 may be axially translatable relative to each other. Translation of the inner pipe body 506 relative to the outer pipe body 502 may change the overall length of the flow line 500. The translation of the outer pipe body 502 may also translate the outer pipe body relative to the sleeve 507.

The flow line 500 may include a pressure containing chamber 521, located between the outer pipe body 502 and the sleeve 507. One or more vent lines 511 may connect the pressure containing chamber 521 to the through-bore 590. The vent lines 511 may allow fluid to flow between the pressure containing chamber 521 and the through-bore 590 as the sleeve 507 and the pipe bodies 502, 506 translate relative to each other. The flow of fluid through the vent lines 511 may prevent the formation of a vacuum or a build-up of incompressible fluid within the pressure containing chamber 521 when the sleeve 507 is translated relative to the outer pipe body 502.

The pressure containing chamber 521 and the vent lines 511 may balance forces acting on the outer pipe body 502. The pressure of the fluid in the through-bore 590 may apply forces internal to the outer pipe body 502 may act to push the outer pipe body 502 away from the inner pipe body 506 in an axial direction. The pressure containing chamber 521 may be designed to counter the axial force by applying an approximately equal and opposite force to the area of seal 517 and any exposed portions of the outer pipe body 502 within the pressure containing chamber 521.

The vent lines 511 may be located such that the inner pipe body 506 does not cover the vent lines 511. An end of the sleeve 507 or the flange 510 may function to limit the axial range of motion of the components. In some embodiments, one or more positive stops (not shown) may be provided on an internal surface or an external surface of the outer pipe body 502 to limit the axial range of motion of the components. Limiting the axial range of motion of the components may prevent unwanted overlap of the outer pipe body 502 with the vent lines 511, thereby ensuring proper venting of the pressure containing chamber 521 over the entire range of lengths at which the flow line 500 may operate.

One or more atmospheric vents 513 allow fluid to flow into or out of a space 523 between the pipe bodies 502, 506 internal to the sleeve 507. The atmospheric vents may allow fluid to flow between the internal space 523 and the atmosphere as the pipe bodies 502, 506 translate relative to each other. The flow of fluid through the atmospheric vents 513 may prevent the formation of a vacuum or a build-up of incompressible fluid within the internal space 523 when the inner pipe body 506 is translated relative to the outer pipe body 502.

Seals 517 may be disposed on either side of the pressure-containing chamber 521. The seals 517 may prevent the flow of fluid out of the pressure-containing chamber 521. A seal 519 may be disposed between the inner pipe body 506 and the outer pipe body 502 to prevent the flow of fluid out of the through-bore 590 through the space between the pipe bodies 502, 506. This seal 519 may be secured in position by a threaded anti-extrusion ring or nut 515 coupled to the outer pipe body 502. An o-ring seal 529 may be provided proximate the seal 519 and disposed between the inner pipe body 506 and the outer pipe body 502. In some embodiments, some or all of the seals 517, 519, may be c-cup seals and may be secured in position relative to one or more of the pipe bodies 502, 506, and/or the sleeve 507 using pins or other positioners. Flow of fluid through the vent lines 511 and the atmospheric vents 513 during translation of the pipe bodies 502, 506 and the sleeve 507 may ensure proper functioning of the seals 517, 519.

The flow of fluid into and out of the pressure containing chamber 521 and the internal space 523 during translation of the pipe bodies 502, 506 and sleeve 507, may allow the pipe bodies 502, 506 to float relative to one another while maintaining proper sealing. Thus, the venting may accommodate minor expansion or contraction of the pipe bodies 502, 506, the sleeve 507, and surrounding components that may occur due to changes in pressure and/or temperature during operation.

The inner pipe body 506 may be securable to the outer pipe body 502. The inner pipe body 506 may include a flange 510, located at a medial area of the flow line 500. The flange 510 may be securable to an end of the sleeve 507. Securing the flange 510 to the sleeve 507 may secure the outer pipe body 502 to the inner pipe body 506, as a result of overlapping shoulders 525, 527, and seals 517, 519. In some embodiments, as shown in FIG. 5, the flange 510 may be integral with the outer surface of the inner pipe body 506. In some embodiments, the flange 510 may be a component disposed around the inner pipe body 506.

The flange 510 and the sleeve 507 may be connected to each other via one or more bolts 509. Threading the bolts 509 through the flange 510 and into the sleeve 507 may prevent translation of the outer pipe body 502 and the sleeve 507 relative to each other. The inner pipe body 506 may be allowed to translate when the pipe is made up.

The inner pipe body 506 and the outer pipe body 502 may be configured to connect to other piping components (not shown). In some embodiments, the inner pipe body 506 may include a first connector flange 520 and the outer pipe body 502 may include a second connector flange 522. The connector flanges 520, 522 may be configured to connect to other piping components. In some embodiments, elements other than connector flanges may be used to connect the flow line 500 to piping components, such as a threaded connection or any other connection known in the art.

In some embodiments, as shown in FIG. 5, the first connector flange 520 may be integral with the outer surface of the first pipe body 506. The second connector flange 522 may comprise a rotatable flange component disposed around the outer pipe body 502. In some embodiments, either connector flange 520, 522 may be formed integrally to the pipe bodies 502, 506, or may be a component disposed around the pipe bodies 502, 506.

Flanges 510, 520, 522 may include holes for attachment to adjacent components and/or holes for use with a linear positioner, such as an all-thread screw. Any, all, or none of the flanges 510, 520, 522 may be fixed or rotatable. The use of a combination of both fixed and rotatable flanges allows the flow line 500 to be coupled to piping components without concern for the relative configuration of the bolt holes in the respective flanges.

The flow line 500 may include features that enable it to be used in wellbore operations. The flow line 500 may be able to withstand high pressures and extreme temperatures and may be robust to damage from erosive materials, such as sand or other particulates flowing therethrough. The seals 517, 519 described above may serve these functions.

The flow line 500 may be adjusted or customized to have a desired length and assembled using one of the following procedures. Two exemplary procedures are described below. However, the flow line 500 may be customized using any combination of steps described below or any other methods know in the art without departing from the scope of the disclosure.

In a first exemplary embodiment, the flow line 500 may be made up before being inserted into a wellbore system. Assembling the flow line 500 may comprise disposing the outer pipe body 502 around the inner pipe body 506 and disposing the sleeve 507 around the outer pipe body 502. Seals 517 may be disposed between the outer pipe body 502 and the sleeve 507. A seal 519 may be disposed between the inner pipe body 506 and the outer pipe body 502, and secured in position by a threaded anti-extrusion ring or nut 515.

The inner pipe body 506 and the outer pipe body 502 may be positioned such that the flow line 500 has a desired length. The pipe bodies 502, 506 may be positioned by translating the outer pipe body 502 relative to the sleeve 507 while the atmospheric vents 513 are unobstructed. Once the desired length is achieved, the pipe bodies 502, 506 may be held in position.

The pipe bodies 502, 506 may be held in position using any means known in the art. For example, the pipe bodies 502, 506 may be clamped in position. The desired length of the flow line 500 may be known, for example, by measuring the distance between the two piping components between which the flow line 500 will be inserted.

The flow line 500 may then be made up. The bolts 509 may be inserted or threaded through the flange 510 and threaded into the sleeve 507. The bolts 509 may lock the pipe bodies 502, 506 and the sleeve 507 in position. The seals 517, 519 may form seals with the pipe bodies 502, 506 and the sleeve 507. The sleeve 507 may form seals with the pipe bodies 502, 506.

In a second exemplary embodiment, the flow line 500 may be made up after being inserted into a wellbore system. Assembling the flow line 500 may comprise disposing the outer pipe body 502 around the inner pipe body 506 and disposing the sleeve 507 around the outer pipe body 502. Seals 517 may be disposed between the outer pipe body 502 and the sleeve 507. A seal 519 may be disposed between the inner pipe body 506 and the outer pipe body 502, and secured in position by a threaded anti-extrusion ring or nut 515.

The inner pipe body 506 and the outer pipe body 502 may be positioned such that the flow line 500 has a desired length. The pipe bodies 502, 506 may be positioned by translating the outer pipe body 502 relative to the sleeve 507 while the bolts 509 are not secured to the sleeve 507. Once the desired length is achieved, the pipe bodies 502, 506 may be held in position.

The pipe bodies 502, 506 may be held in position by being secured to piping components, for example, via the connector flanges 520, 522. The desired length of the flow line 500 may not be known. Instead, connecting the pipe bodies 502, 506 to the piping components may position the pipe bodies 502, 506 such that the flow line 500 has a desired length.

The flow line 500 may then be made up. The bolts 509 may be inserted or threaded through the flange 510 and threaded into the sleeve 507. The bolts 509 may lock the pipe bodies 502, 506 and the sleeve 507 in position. The seals 517, 519 may form seals with the pipe bodies 502, 506 and the sleeve 507. The sleeve 507 may form seals with the pipe bodies 502, 506.

An adjustable/customizable flow line in accordance with the present disclosure may have some or all of the features of any embodiment 100, 200, 300, 400, 500 discussed above, a combination of features of the embodiments 100, 200, 300, 400, 500 and/or other features.

Figure 6:
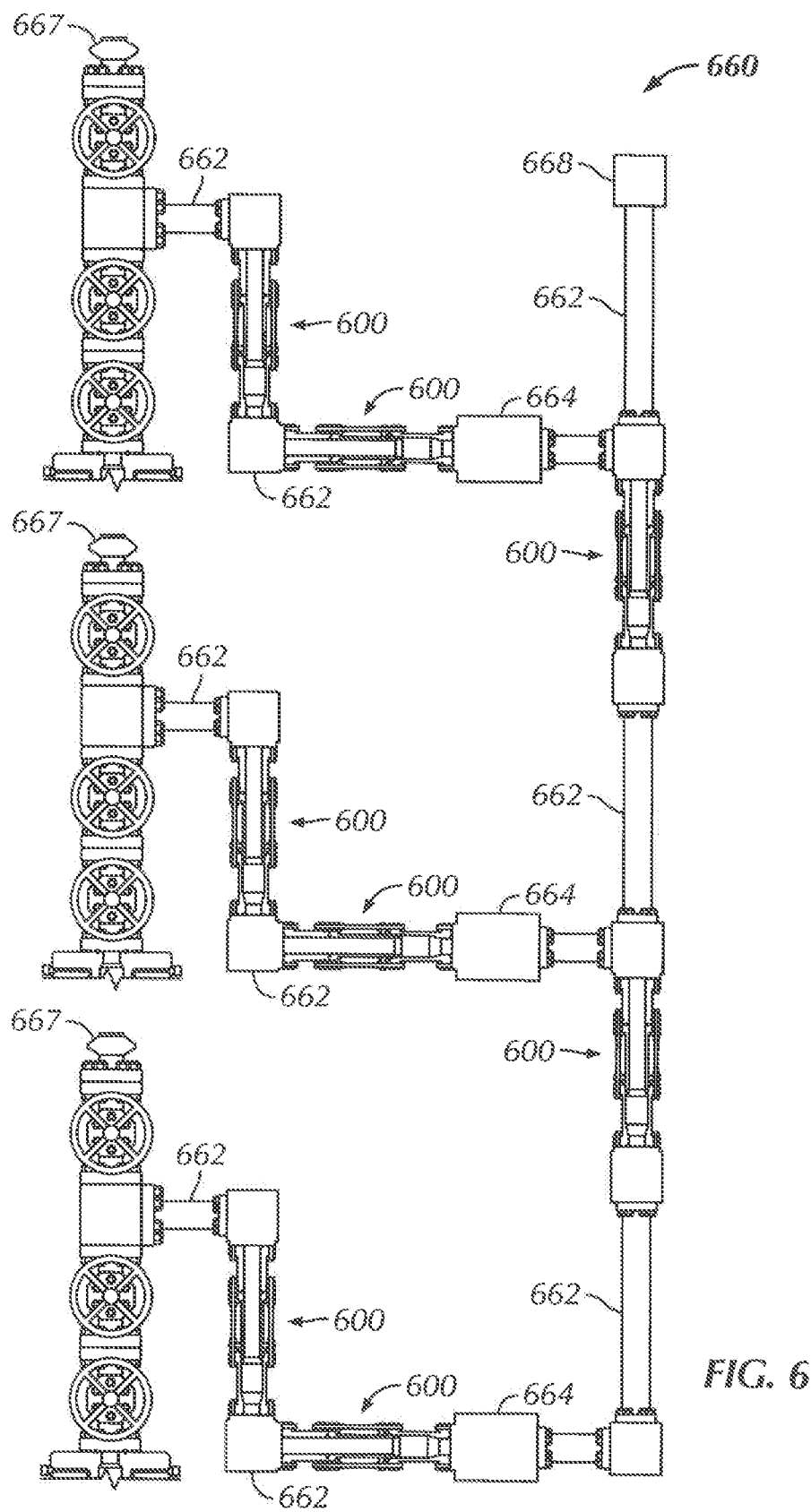
FIG. 6 is a side view of a system in accordance with the present disclosure.
Figure 7:
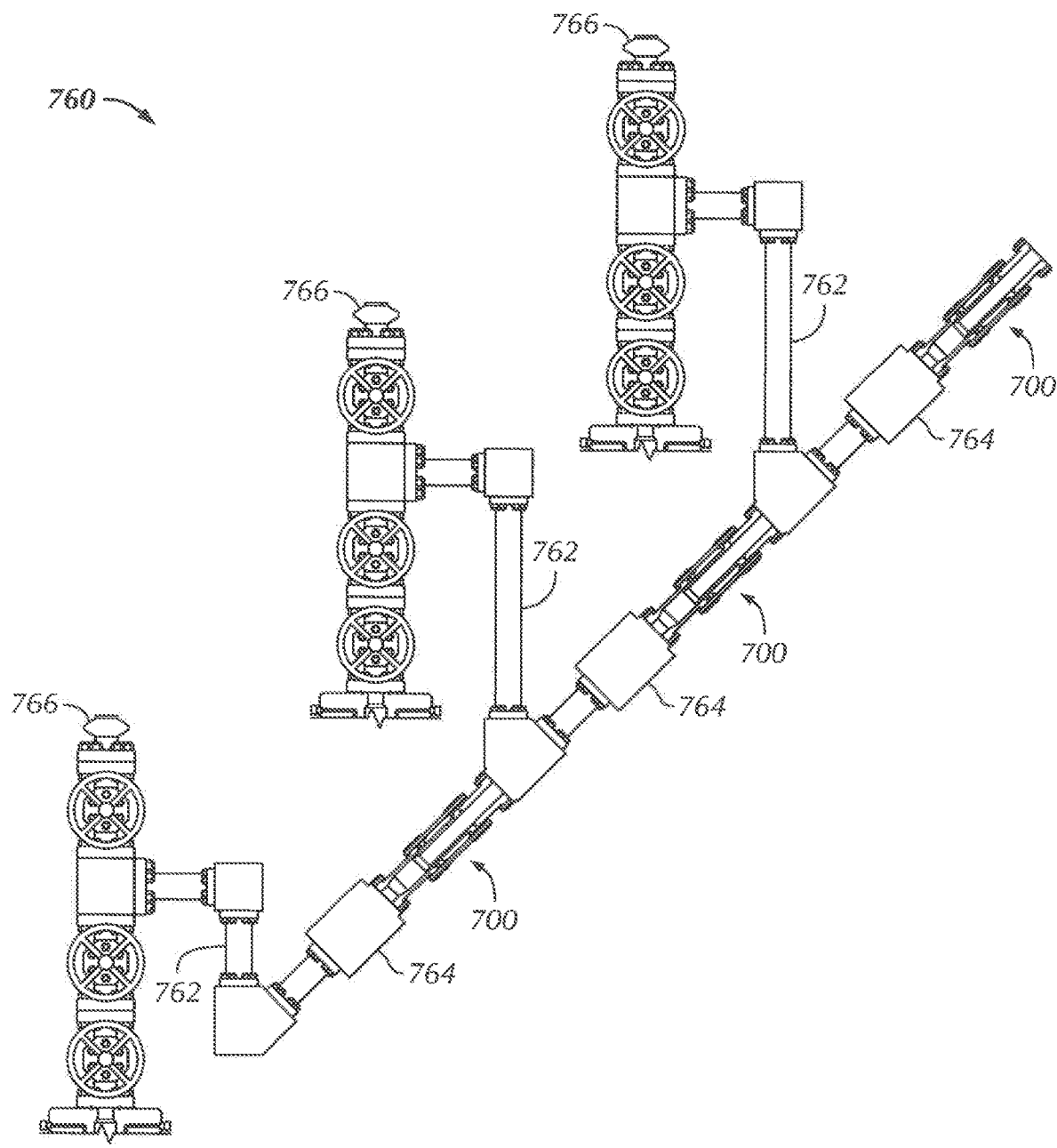
FIG. 7 is a schematic view of a system in accordance with the present disclosure.

In another aspect, the present disclosure relates to a system for performing wellbore operations including a flow line 100, 200, 300, 400, 500 according to any embodiment or combination of embodiments described above. Although particular systems are detailed below, the system may be any type of drilling or wellbore operation system without departing from the scope of the disclosure. FIGS. 6-7 illustrate systems 660, 760 in accordance with the present disclosure.

FIG. 6 illustrates a system 660 which may include fracture trees 667 and manifold valve blocks 664. The fracture trees 667 and the manifold valve blocks 664 may be secured to a substrate surface. Each fracture tree 667 may be connected to a manifold valve block 664 using a combination of traditional piping components 662 and adjustable/customizable flow lines 600. The adjustable/customizable flow lines 600 may allow the distance of the connection to be adjusted in two directions. The manifold valve blocks 664 may be connected to a main pipeline 668 including both traditional piping components 662 and adjustable/customizable flow lines 600.

FIG. 7 illustrates a system 760 which may occupy less space than traditional systems. The system 760 may include fracture trees 766 and manifold valve blocks 764. The fracture trees 766 and the manifold valve blocks 764 may be secured to a substrate surface. Each fracture tree 766 may be connected to a manifold valve block 764 via traditional piping components 762. Adjustable/customizable flow lines 700 may be connected between the manifold valve blocks 764 and the traditional piping components 762 connecting the manifold valve blocks 764 to the fracture trees 766. A configuration such as that shown in FIG. 7 may be difficult or time-consuming to achieve using only traditional piping components.

As shown in FIGS. 6-7, the flow lines of the present disclosure may be advantageously used to connect equipment in a variety of configurations, because the flow lines may be adjusted/customized to have the necessary length to form a variety of connections. Further, the flow lines may allow a system to be arranged in configurations that occupy less space or require fewer connection elements than traditional systems, or that have other characteristics desired for a particular system. For example, adjustable/customizable flow lines may allow a system to be assembled around other equipment or natural features of a substrate surface.

In another aspect, the present disclosure relates to a system of performing a wellbore operation using a flow line 100, 200, 300, 400, 500 according to any embodiment or combination of embodiments described above. Although wellbore operations are detailed below, the method may be any operation requiring injection of fluid through the flow line without departing from the scope of the disclosure. FIGS. 8-9 illustrate methods of performing wellbore operations in accordance with the present disclosure.

Figure 8A:
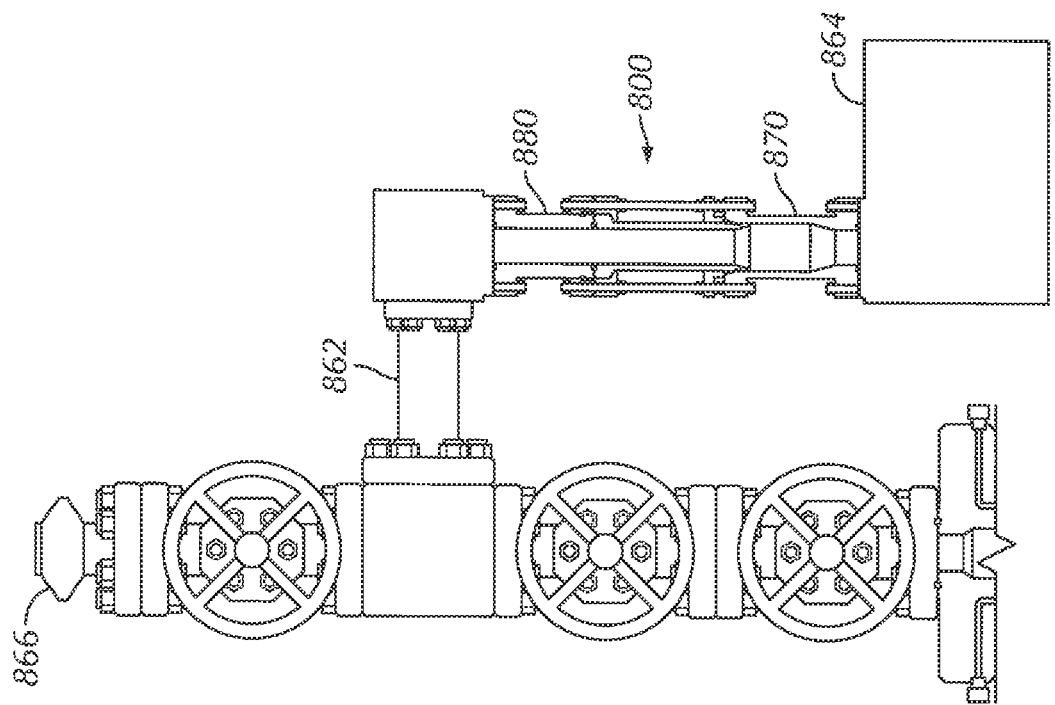
FIGS. 8a-8b are schematic views of a system in accordance with the present disclosure.
Figure 8B:
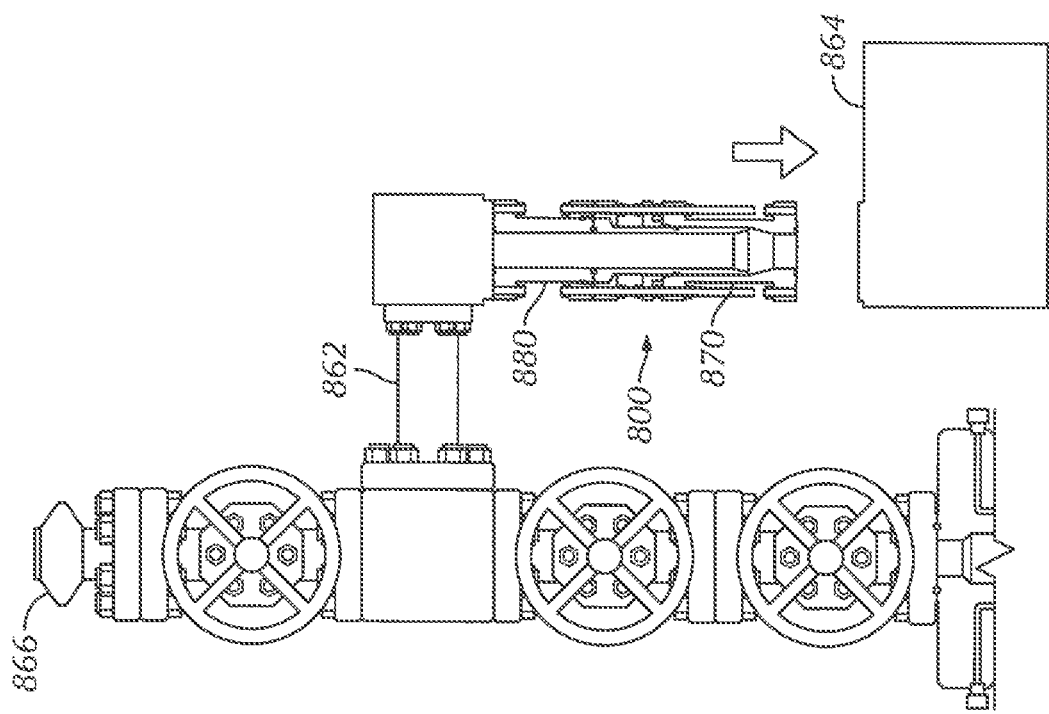

FIGS. 8a-8b illustrate a method of performing a wellbore operation using an adjustable flow line 800. As shown in FIG. 8a, a fracture tree 866 and a manifold valve block 864 are disposed on a surface. The manifold valve block 864 may be moved proximate the fracture tree 866 using a fork lift or crane. The outlet 880 of an adjustable flow line 800 is connected to the fracture tree 866 via a traditional piping component 862.

As shown in FIG. 8b, the adjustable flow line 800 may be extended, using any of the procedures described above, such that the inlet 870 contacts the manifold valve block 864. The adjustable flow line 800 may be secured in position, using any of the procedures described above. The adjustable flow line 800 may be secured to the manifold valve block 864.

The manifold valve block 864, the adjustable flow line 800, the traditional piping component 862, and the fracture tree 866 may be connected to other elements of a system before or after the steps above are performed. A frac fluid may be injected through the system, such that the fluid flows into the inlet 870 of the adjustable flow line 800 and out of the outlet 880.

Figure 9C:
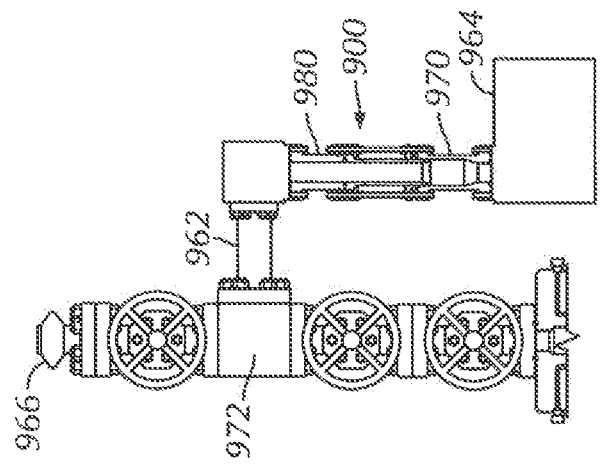
FIGS. 9a-9c are schematic views of a system in accordance with the present disclosure.
Figure 9B:
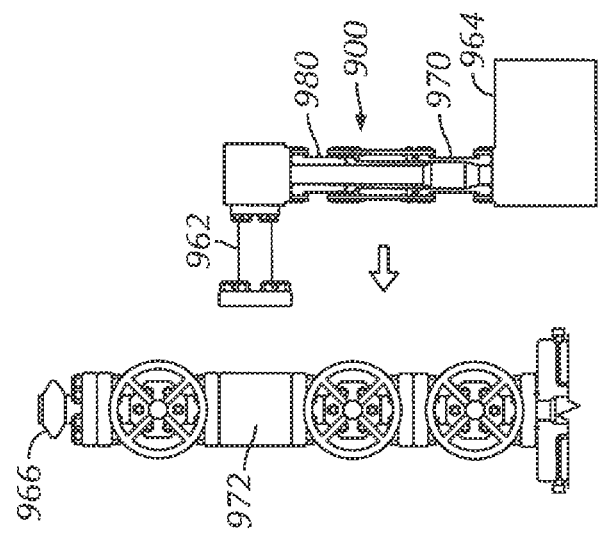
Figure 9A:
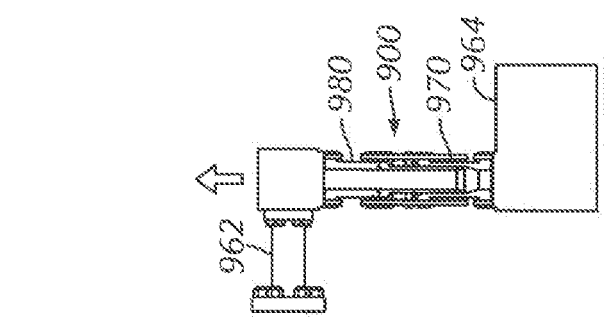

FIGS. 9a-9c illustrate a method of performing a wellbore operation using an adjustable flow line 900. As shown in FIG. 9a, a fracture tree 966 and a manifold valve block 964 are disposed on a surface. The inlet 970 of the adjustable flow line 900 may be connected to the manifold valve block 964. A traditional piping component 962 may be connected to the outlet 980 of the adjustable flow line 900.

As shown in FIG. 9b, the adjustable flow line 900 may be extended, using any of the procedures described above, such that the traditional piping component 962 is level with a connector 972 of the fracture tree 966. The adjustable flow line 900 may be secured in position, using any of the procedures described above.

As shown in FIG. 9c, the manifold valve block 964 may be translated using any means known in the art, for example, via a fork lift, such that the traditional piping component 962 contacts the connector 972. The traditional piping component 962 may be secured to the connector 972. Alternatively, a second adjustable flow line (not shown) may be used in place of the traditional piping component. The second adjustable flow line may be extended such that the outlet of the second adjustable flow line contacts the connector 972 and the second adjustable flow line may be secured in position and secured to the connector 972. Such a configuration may prevent the manifold valve block 964 from having to be moved.

The manifold valve block 964, the adjustable flow line 900, the traditional piping component 962, and the fracture tree 966 may be connected to other elements of a system before or after the steps above are performed. A frac fluid may be injected through the system, such that the fluid flows into the inlet 970 of the adjustable flow line 900 and out of the outlet 980.

Although the methods illustrated in FIGS. 8-9 are shown being performed on land, similar methods could be performed in an environment. For example, the method of FIG. 8 could be performed to connect a fracture tree and a manifold valve block previously disposed on a substrate surface without requiring movement of either component. The method of FIG. 9 could be performed by moving the manifold block valve using a remote operated vehicle, which may already be on-site at the location.

The flow lines of the present disclosure, the systems including the flow lines, and the methods of performing operations using the flow lines may provide several advantages over traditional flow lines, systems, and methods. As described above, flow lines according to the present disclosure are robust for use in operating conditions including liquids at high pressures and extreme temperatures and containing erosive particulates.

Additionally, flow lines according to the present disclosure may be adjusted or customized to have a desired length. This may allow the flow lines to be connected to piping components or equipment precisely, such that no gaps are formed in the connections. The flow lines, system, and method disclosed herein may be less susceptible to failure caused by damage or leaks at the connections between the flow lines and other components. This may reduce the risk of harm to equipment, the surrounding environment, or personnel. The flow lines described herein may have extended lifespans compared to traditional flow lines because the flow lines may sustain less damage at connection points and other areas, and therefore may not need to be replaced as frequently as other flow lines. Reducing failure of flow lines and the need to replace flow lines may increase the productivity of a site or operation. The site or operation may not need to be shut down as frequently to replace equipment or to repair damaged equipment.

Having the ability to adjust the length of a flow line after it has been manufactured may present further advantages. The location and orientation of the components to be connected may not have to be measured precisely, thereby reducing time, personnel, and cost requirements. Use of an adjustable flow line may reduce or eliminate the need to manufacture an entirely new flow line if location measurements are made incorrectly, thereby further reducing time, personnel, and cost requirements. These advantages may be particularly beneficial in connecting equipment that has already been disposed at a site, as measuring the location and orientation of the equipment may be particularly difficult and time-consuming.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. An adjustable flow line comprising:
an outer pipe body;
an inner pipe body partially disposed within the outer pipe body and axially translatable with respect to the outer pipe body;
a metal seal positioned between an outer surface of the inner pipe body and an inner surface of the outer pipe body;
a sleeve positioned around the inner pipe body and outside of the outer pipe body, wherein the sleeve is axially translatable with respect to the inner pipe body; and
a first flange positioned around the inner pipe body and the outer pipe body includes a second flange, wherein when connected to the second flange, the first flange axially secures the sleeve with respect to the outer pipe body and causes the sleeve to energize the metal seal when the first flange and the second flanges are fully secured to each other, such that an end of the sleeve is pressed against an end of the metal seal,
wherein the sleeve comprises a threaded inner surface and the inner pipe body comprises a threaded outer surface, and wherein the sleeve is configured to translate with respect to the inner pipe body via rotation of one of the sleeve and the inner pipe body with respect to the other of the sleeve and the inner pipe body, and
wherein the first flange comprises a rotatable flange positioned around and in contact with a shoulder of the sleeve.

2. The adjustable flow line of claim 1, wherein the metal seal comprises a wedge-shaped seal.

3. The adjustable flow line of claim 2, wherein the wedge-shaped seal is disposed within a wedge-shaped pocket formed by an outer surface of the inner pipe body and an inner surface of the outer pipe body.

4. The adjustable flow line of claim 3, wherein the wedge-shaped pocket comprises an opening at an end of the outer pipe body through which the inner pipe body is at least partially disposed within the outer pipe body.

5. The adjustable flow line of claim 1, wherein the first flange is integrally formed with the sleeve.

6. The adjustable flow line of claim 5, wherein the first flange is connectable to the second flange via one or more threaded rods.

7. The adjustable flow line of claim 1, further comprising an elastomer seal disposed between the inner pipe body and the outer pipe body.

8. The adjustable flow line of claim 1, wherein a contact seal is formed between the outer pipe body and the inner pipe body, in an area of contact in which an inner surface of the outer pipe body is proximate an outer surface of the inner pipe body.

9. A method of performing a wellbore operation using a flow line according to claim 1, the method comprising:
attaching the inner pipe body to a first piping component;

adjusting a length of the flow line;
attaching the outer annular body to a second piping component;
securing the flow line in position and activating the metal seal; and
injecting a frac fluid into the first piping component.

10. A method of performing a wellbore operation using a flow line according to claim 1, the method comprising:
adjusting a length of the flow line;
securing the flow line in position and activating the metal seal;
attaching the inner pipe body to a first piping component;
attaching the outer annular body to a second piping component; and
injecting a frac fluid into the first piping component.

11. A system comprising a flow line according to claim 1, the system comprising:
the flow line;
a first component connected to an inlet of the flow line; and
a second component connected to an outlet of the flow line.

12. The system of claim 11, wherein the first component and the second component are each one of the following: a piping component, a manifold valve block, a t-shaped piping component, or a christmas tree.

13. A system comprising:
one or more fracture trees; and
a plurality of manifold valve blocks;
wherein each of the one or more fracture tree is connected to one of the plurality of manifold valve blocks via one or more flow lines according to claim 1, and
wherein each of the plurality of manifold valve blocks is connected to at least one other manifold valve block of the plurality of manifold valve blocks via one or more flow lines according to claim 1.

\* \* \* \* \*